May 21, 1946.　　H. J. DANA ET AL　　2,400,489
PHOTOELECTRIC COUNTER AND SPEED MEASURING DEVICE
Filed June 19, 1942
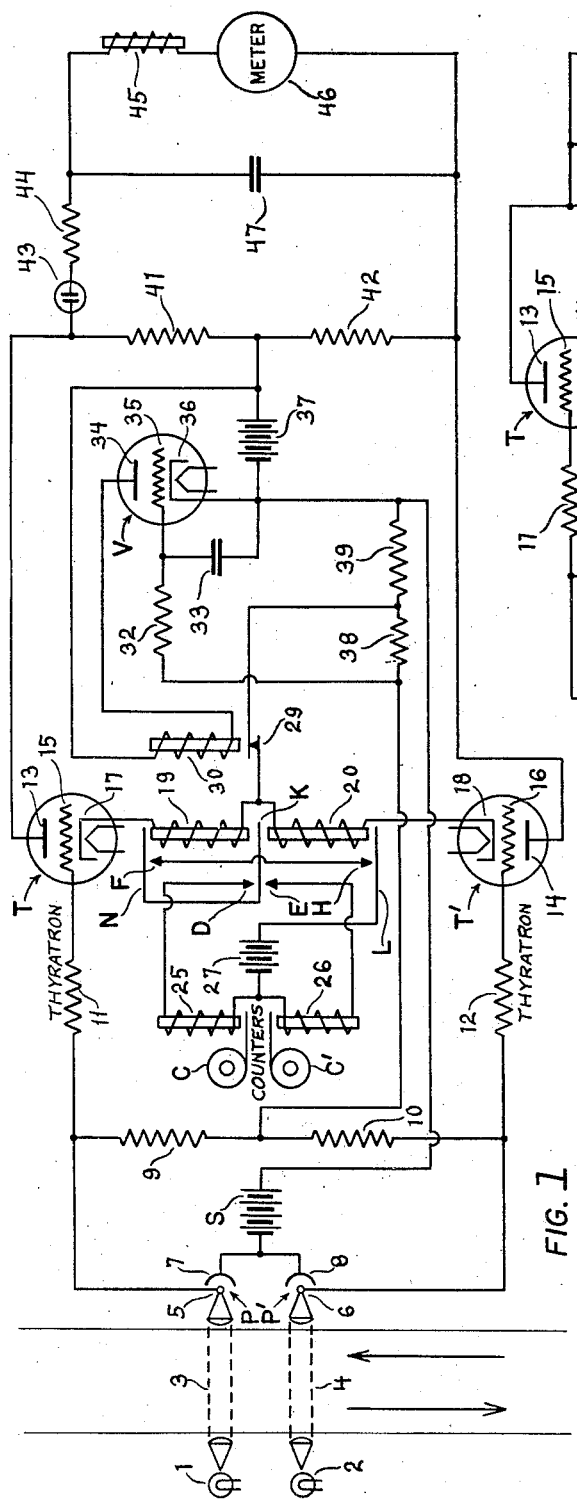
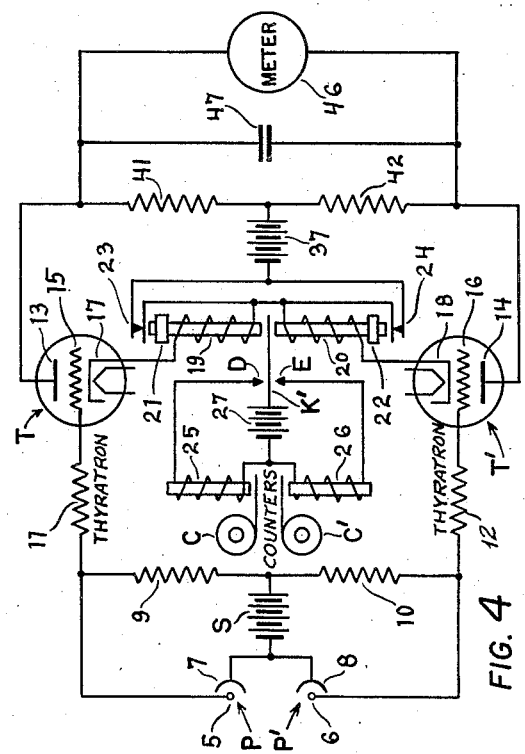
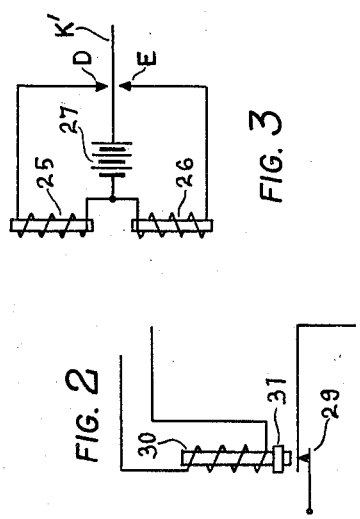
HOMER J. DANA
HOWARD F. CLARKE
　　　　INVENTORS
BY O.W.Lee
　　ATTORNEY Patented May 21, 1946

2,400,489

UNITED STATES PATENT OFFICE 2,400,489

PHOTOELECTRIC COUNTER AND SPEED MEASURING DEVICE

Homer J. Dana and Howard F. Clarke, Pullman, Wash., assignors to State College of Washington Research Foundation, Pullman, Wash., a corporation of Washington Application June 19, 1942, Serial No. 447,740

8 Claims. (Cl. 235—92)

The present invention relates to a photoelectric counter and speed measuring device for determining the speed and volume of vehicle traffic traveling in opposite directions upon a highway, and is particularly directed to certain new and useful improvements which enable the invention to separately count the vehicles traveling in opposite directions and to indicate the speed and direction of travel in each instance.

The invention employs two parallel beams of light directed across the highway and into two photo-electric cells on the other side, with electronic circuits which selectively operate two counting devices, one for each direction of travel, and the same circuits also operate a timing meter selectively to indicate the speed and direction of travel of each vehicle.

The selective counting and timing of traffic traveling in opposite directions is accomplished by two symmetrical circuits, each including a thyratron, and each having a photo-electric cell through which the negative bias is supplied to maintain grid control of the thyratron of that circuit, so as to render each of these two thyratrons selectively operative when a passing vehicle intercepts the light beam of the photo-electric cell supplying its grid bias. Each of these thyratron circuits includes a relay coil and these two coils have a common connection to the power supply for both thyratron circuits which also have a common connection to a single restoring circuit for rendering them inactive after each count interval. The two-directional counting is afforded by only one relay selectively operated by these two coils; and only one relay in the restoring circuit suffices for restoring both thyratrons to their inactive stage after each counting interval. Means are provided to preclude the restoring circuit from completing its cycle during a count interval, and means are provided for eliminating pedestrians from the count.

The invention presents the advantage of a two-directional count with elimination of pedestrians from the count, and a two-directional speed indication, all of which is accomplished by a simplified embodiment which greatly reduces the amount of equipment which would otherwise be required to accomplish similar results and advantages.

The accompanying drawing illustrates the nature and principle of the invention which has been reduced to practice and is now in successful operation.

Fig. 1 diagrammatically shows the preferred embodiment of the invention, wherein the counting circuit includes a relay for selective elimination of pedestrians from the count.

Fig. 2 is a fragmentary diagram showing one mode of retarding the return of grid control to the thyratrons.

Fig. 3 is a diagrammatic showing of the counting circuit, with a simplified relay switch.

Fig. 4 is a diagrammatic showing wherein the restoring circuit of Fig. 1 is supplanted by delay action coils applied to the paired relay coils.

Fig. 1 shows the preferred form of the invention which includes a counting circuit and a speed measuring circuit, operated by an actuating circuit and a restoring circuit. The counting circuit comprises the paired solenoids 25 and 26 which have a common connection to one pole of the battery 27, the opposite pole of which is selectively connectible to either of these solenoids through the switch contacts D and E, preferably by a series relay as here shown. These solenoids operate two counter registers such as C and C' which may be of any suitable form, but are preferably such as will periodically print the traffic totals and subtotals, say hourly, and print and clear the grand total every twelve hours. However, the ordinary visual dial type, manually reset, will suffice. It will of course be understood that the diagrammatic showings at C and C' are merely intended to represent separate counter banks and that both of them can readily be embodied in a single piece of equipment having whatever facilities that may be desired, such matters being optional and are no part of the present invention.

The actuating circuit includes two thyratrons T and T' which have their respective cathodes 17 and 18 connected to the relay coils 19 and 20 which have a common connection through the relay switch 29 and resistor 39 to the negative side of the battery 37 which has its positive side connected in common to the resistors 41 and 42 which are respectively connected to the anodes 13 and 14 of the thyratrons which have their respective grids 15 and 16 connected through resistors 11 and 12 to the anodes 5 and 6 of the photo-electric cells P and P'. These anodes 5 and 6 are connected through the respective resistors 9 and 10 to the resistors 38 and 39 which are connected in series to the positive pole of the battery S which has its negative pole connected in common to the cathodes 7 and 8 of these photo-electric cells P and P'. From the two light sources 1 and 2, the beams of light 3 and 4 are focused parallel across the highway and upon these two photo-electric cells, so as to render them conductive for the purpose of supplying negative bias potential to the grids of both thyratrons to maintain each thyratron inactive until its respective light beam is interrupted.

The described relay coils 19 and 20 operate the switch K selectively between the contacts D and E which are respectively connected to the counting solenoids 25 and 26 which have a common connection to one pole of the battery 27 which has its opposite pole connected to the switch L which is operated by the relay coil 20 so as to engage the relay contact H which is connected to a similar contact F which is in operative relation with the switch N which has a connection to the switch K and is operated by the relay coil 19.

The restoring circuit includes the switch 29 which is opened by the relay coil 30 which is connected in series between the positive pole of the battery 37 and the anode 34 of the vacuum tube V which may be of any suitable type. The cathode 36 is connected to the negative pole of the battery 37, and the condenser 33 is connected between this cathode 36 and the grid 35. The resistors 32, 38 and 39 connect the grid 35 to the cathode 36 and to the positive pole of the battery S so as to supply the negative potential which biases the vacuum tube V to cut-off.

In operation, the light beams 3 and 4 render the photo-electric cells P and P' conductive to the flow of current from the battery S and this current passes through resistors 39 and 38 and divides through the resistors 9 and 10 to produce a negative bias potential on the grids of both thyratrons T and T" sufficient to preclude current from flowing between the cathodes and anodes thereof, which condition constitutes the inactive stage of operation. The counting is accomplished by the interruption of the light beams. Interruption of the light beam 3 renders the photo-electric cell P nonconductive and stops the flow of current through the resistor 9, thereby reducing the bias potential on the grid 15 sufficiently to establish a current flow between the cathode and anode of the thyratron T. This current flow energizes the relay coil 19 so as to move the switch K against the contact D and the switch N against the relay contact F. The succeeding interruption of the beam 4 renders the photo-electric cell P' nonconductive and stops the flow of current through the resistor 10 thereby reducing the bias potential on the grid 16 of the thyratron T', which establishes a flow of current between the cathode 18 and anode 14, so as to energize the relay coil 20 which then moves the switch L to engage the relay contact H and complete the circuit between the battery 27 and the counting solenoid 25. The switch K having been previously drawn towards the coil 19 it is sufficiently distant from the coil 20 that it is not moved towards the latter.

During the obstructed period of the light beams there is no current supply from the battery S to the resistors 39 and 38, and the negative potential which normally biases the vacuum tube V to cut-off is absent, during which period, current from the battery 37 flows through the resistor 39 and switch 29 to the two thyratrons T and T' so that the potential drop across the resistor 39 is reversed, and the negative charge on the condenser 33 and grid 35 gradually leaks to the cathode 36, and a charge of positive electrons gradually accumulates on the condenser 33 and grid 35. As soon as the negative bias is sufficiently reduced, current from the battery 37 to the cathode 36 then flows through the vacuum tube V and establishes the anode current to energize the relay coil 30 which then opens the switch 29 to stop the flow of current from the battery 37 to both thyratrons, whereupon the relay coils 19 and 20 become inactive and the switch K assumes its neutral position, as do also the switches N and L.

The switch 29 being held open, the battery 37 ceases to supply the positive potential to the grid 35 and condenser 33 and therefore they gradually leak their charge of positive electrons to the cathode 36. When the light beams again render the photo-electric cells conductive, the negative bias from the battery S is again supplied to the thyratrons T and T' through the resistors 39 and 38, whereupon a charge of negative electrons gradually accumulates on the condenser 33 and grid 35, so as to bias the vacuum tube V to cut-off and thus stop the flow of anode current to the relay coil 30, whereupon the switch 29 closes. The condenser 33 and resistor 32 serve as a delay circuit to retard the opening and closing of the switch 29. The time duration of each delay period depends upon the size of the condenser 33 and resistor 32 which are suitably proportioned so as to provide adequate time for completing the counting operation before the switch 29 is opened and to assure that it will not close until after the bias control is again returned to the thyratrons. It is not necessary that these periods be longer than a fraction of a second, but it is necessary that they should not be too small a fraction to suffice for the required purposes.

The described sequences constitute one complete cycle of a single counting operation, and the equipment is then in the initial state, and in readiness for the succeeding count. That is to say, the negative bias upon the grids of the thyratrons will preclude any current flow from the battery 37 until such time as the light beams are again interrupted. It will of course be understood that travel in the opposite direction produces similar operation except that the thyratron T' is actuated first and the count occurs on the counting solenoid 26 instead of 25.

In the described embodiment of Fig. 1 it will be noted that neither of the counting solenoids 25 and 26 can receive current from the battery 27 unless the passing object is of sufficient size to extend from one light beam to the other so as to interrupt the negative bias to both thyratrons before it is returned to either of them. This is for the purpose of eliminating pedestrians from the count, and it will be understood that the two light beams 3 and 4 are spaced a sufficient distance apart to accomplish that purpose, say from twenty-four to thirty-six inches apart. When the invention is used in a location where the traffic does not include pedestrians, the relay switches N and L with their contacts F and H can be omitted, and the switch K connected direct to the battery 27 in the manner shown at K' in Fig. 3, which showing is readily interchangeable with that of Fig. 1.

In the preferred embodiment, the previously described circuits are also employed to control the operation of the meter circuit which indicates the speed and direction of travel. As here shown the meter 46, choke coil 45, resistor 44 and neon lamp 43 are connected in series between the anodes 13 and 14 of the two thyratrons T and T', and the condenser 47 forms a shunt across the choke coil 45 and the meter 46.

The meter may be of any suitable type, either recording or visually indicating, but preferably it should be of the graphic recording type. When tials to the grid 35, and of course these two resistors can be supplanted by a single adjustable resistor.

It will be understood that the described batteries S, 27 and 37 are shown for the convenience of illustration and each of them may be supplanted by the well known power pack which consists of a transformer, a rectifier, and a filter. The solenoids 25 and 26 may be made to operate on alternating current, so as to use that form of power source instead of the battery 27.

The invention has been described with relation to automobile traffic upon the highways, but it will be understood that it is equally applicable to various other purposes.

In the present disclosure, we claim as our invention:

1. In a photo-electric device for selectively counting objects traveling in opposite directions, two thyratrons arranged in two symmetrical circuits having a common power source, means for supplying negative bias potentials to said thyratrons, two photo-electric cells independently controlling the bias supply to the respective thyratrons, two relay coils arranged one in each symmetrical circuit, a two-way series relay switch selectively operated by the combined action of said relay coils according to sequence, two counting circuits selectively closed by the operation of said switch, and a delayed action relay switch to stop the flow of plate current from said thyratrons and terminate each counting interval.

2. In a photo-electric device for selectively counting objects traveling in opposite directions, two thyratrons arranged in two symmetrical circuits having a common power source, means for supplying negative bias potentials to said thyratrons, two photo-electric cells independently controlling the bias supply to the respective thyratrons, two relay coils arranged one in each symmetrical circuit, a two-way relay switch selectively operated by said relay coils according to sequence, two counting circuits selectively closed by the operation of said switch, and a delayed action relay switch to stop the flow of plate current from said thyratrons and terminate each counting interval.

3. A two-direction electronic counting device comprising two photo-electric cells rendered conductive by light beams spaced apart in parallel relation to each other and intersecting the paths of objects traveling in opposite directions, two thyratrons arranged in two symmetrical circuits including a common power source, two symmetrical bias circuits supplying said thyratrons with negative potentials through said photo-electric cells to afford grid bias control of the respective thyratrons, two relay coils independently energized by the respective thyratrons in accordance with the sequence of interruption of said light beams, a two-way relay switch selectively operated by said relay coils, two counting circuits including a power source and two solenoid actuated counters selectively energized by the operation of said switch, a normally closed switch for breaking the plate current flow in both thyratron circuits, a grid controlled vacuum tube and a solenoid in series with the power source of said thyratrons, and a time delay circuit connecting the control grid of said vacuum tube in common to said bias circuits so that the last said solenoid will open said latter switch in response to interruption of said light beams and hold it open until grid bias control of said thyratrons is again established by conductivity of said photo-electric cells.

4. A two-direction electronic counting device comprising two photo-electric cells rendered conductive by light beams spaced apart in parallel relation to each other and intersecting the paths of objects traveling in opposite directions, two thyratrons arranged in two symmetrical circuits including a common power source, two symmetrical bias circuits supplying said thyratrons with negative potentials through said photo-electric cells to afford grid bias control of the respective thyratrons, two relay coils independently energized by the respective thyratrons in accordance with the sequence of interruption of said light beams, a two-way series relay switch selectively operated by the combined action of said relay coils according to sequence, two counting circuits including a power source and two solenoid actuated counters selectively energized by the operation of said switch, a normally closed switch for breaking the plate current flow in both thyratron circuits, a grid controlled vacuum tube and a solenoid in series with the power source of said thyratrons, and a time delay circuit connecting the control grid of said vacuum tube in common to said bias circuits so that the last said solenoid will open said latter switch in response to interruption of said light beams and hold it open until grid bias control of said thyratrons is again established by conductivity of said photo-electric cells.

5. An electronic counting device for selectively counting objects traveling in opposite directions, comprising two symmetrical circuits each having a thyratron supplied with negative bias potentials, two photo-electric cells controlling the bias supply to the respective thyratrons, a common power source for said symmetrical circuits, two relay coils arranged one in each symmetrical circuit, a two-way series relay switch selectively operated by the combined action of said relay coils according to sequence, two solenoid actuated counters selectively controlled by the operation of said switch, and a delayed action relay switch to stop the flow of plate current from said thyratrons and terminate each counting interval.

6. A photo-electric counting device for selectively counting objects traveling in opposite directions, comprising two symmetrical circuits including a common power source, each of said circuits having a grid controlled vacuum tube and a relay coil, a two-way relay switch selectively operated by said relay coils according to sequence, two solenoid actuated counters selectively controlled by said switch, means for supplying negative bias potentials to the control grid of each of said vacuum tubes, two photo-electric cells controlling the bias supply to the respective control grids for selectively rendering said symmetrical circuits inactive when said photo-electric cells are rendered conductive by light beams focused thereon, and a delayed action relay switch to stop the flow of plate current in said symmetrical circuits in response to interruption of light beams focused upon said photo-electric cells.

7. A photo-electric counting device for selectively counting objects traveling in opposite directions, comprising two thyratrons arranged in two symmetrical circuits including a common power source, means for supplying negative bias potentials to said thyratrons, two photo-electric cells controlling the bias supply to said thyratrons respectively, said thyratrons being biased to cut-off when said photo-electric cells are rendered electroconductive by light beams focused the thyratron T fires first, the current which flows through it from the battery 37 will produce sufficient potential difference across the resistor 41 to cause a current flow through the neon lamp 43 and the resistor 44, and due to the presence of the choke coil 45 some of this latter current flows to the meter 46 and the remainder gradually builds up a charge on the condenser 47. When the light beam 4 is later interrupted, the current flow through the thyratron T' produces across the resistor 42 a potential difference equal and opposite to that appearing across the resistor 41, and these opposite potentials cancel each other and thereby stop the current flow to the meter 46 and condenser 47, whereupon the condenser will leak its charge to the meter 46. This potential leak is retarded by the inductance of the choke coil 45 and the inductance of the meter 46, and it will be understood that the extent to which the meter is actuated will depend upon the potential built up in the condenser 47, which of course will depend upon the time interval between the interruption of the light beams 3 and 4. When the potential of the condenser 47 returns to zero, the meter will swing back to its zero position, which of course is mechanically accomplished in the well known manner, usually by spring action. The meter may be provided with a dial graduated in terms of miles per hour, or preferably it is provided with a graph point upon a suitable chart moved by a clock mechanism, so as to produce a graph record of the speed and direction of travel of the vehicles. That is to say, the sequence of interruption of beams 3 and 4 will be determinative of the directional sway of the meter 46, and the speed of travel of each vehicle will determine the extent of the excursions of the meter, which are inversely proportional to the speed.

From the foregoing description, it will be seen that the invention employs two symmetrical thyratron circuits, which are controlled by a single restoring circuit which includes a delay circuit to preclude the restoring circuit from completing its cycle until after the bias control has been restored to the grids of the thyratrons. It will be noted that the invention employs but two relays, one of which is in the restoring circuit and the other selectively operates the two-direction counting circuit. This materially reduces the amount of equipment which would otherwise be required to accomplish the two-directional counting. This simplified equipment not only accomplishes the two-directional counting, but the same circuits are also employed to operate the two-directional speed measuring circuit simultaneously with the counting. Moreover, the solenoid counting circuit is entirely segregated from all else and can be removed without disrupting the operation of the speed measuring circuit, and in like manner, the speed measuring circuit can be removed without disrupting the operation of the counting circuit.

The described circuits are susceptible of such modification as will afford the described operations in a satisfactory manner. As for instance, there is shown in Fig. 2 a delay action coil 31 applied to the relay coil 30 so as to eliminate the previously described delay circuit at 32 and 33. This showing in Fig. 2 will suffice when the rate of travel is reasonably uniform and sufficiently fast; however, the time delay interval of a delay action coil such as shown at 31 in Fig. 2 is limited to a short period and it would suffice only in instances where the counting interval is less than the delay period of the delay coil.

Fig. 4 shows a simplified embodiment in which the previously described relay coils 19 and 20 are each provided with a delay action coil as indicated at 21 and 22, and are each provided with a relay switch as indicated at 23 and 24. The battery 37 is directly connected to the common lead of these two switches, and the battery S is connected directly to the common lead of the resistors 9 and 10. This showing in Fig. 4 may be used to supplant the entire restoring circuit which has been previously described and shown in Fig. 1. These delay action coils 21 and 22 are subject to the same limitations as previously described relative to Fig. 2; however, they will suffice in any instance where the requirements do not exceed the limitations.

It will be noted that in Fig. 4 the switch K' is connected directly to one pole of the battery 27 which has its opposite pole connected in common to the two counting solenoids 25 and 26 and that the circuit is completed to each solenoid selectively, according to which of the switch contacts D or E is engaged by the switch K' which is disposed between the relay coils 19 and 20 so as to accomplish the two-directional counting. This embodiment will suffice where the traffic does not include pedestrians, or in any instance where it is not desired to resort to the previously described series relay switch for the battery 27.

In Fig. 4 the meter 46 is connected in series between the anodes 13 and 14, and the condenser 47 forms a shunt across the meter. That is to say, Fig. 4 omits the neon lamp 43, resistor 44 and choke coil 45 which are shown in Fig. 1 and which are preferable, but are not always absolutely necessary.

The purpose of the condenser 47 is to store up a portion of the energy, so as to prolong the metering period according to the responsiveness of the meter, in order to enable the meter to make an adequate excursion. The choke coil 45 is used to control the rate of energy flow in accordance with the responsiveness of the meter. These expedients are employed where the time interval to be measured is an extremely short period, and also for the purpose of coordinating the energy flow in accordance with the calibrations of the meter, so as to provide for the use of whatever suitable meter that may be readily available. Where the time interval to be measured is of sufficient length and the meter is sufficiently responsive, either one or both of these expedients may be omitted.

The neon lamp 43 serves as a valve to determine the energy flow to the meter circuit, and also to obviate a reverse flow of the energy discharged from the condenser. The purpose of the resistor 44 is to reduce the potential which charges the condenser 47, so that the leak from the condenser will be at a potential sufficiently low to preclude a reverse flow through the neon lamp 43, thus assuring an adequate energizing of the meter by the potential leak from the condenser. Where the time interval to be measured is of sufficient length and the meter is sufficiently responsive that the reverse leak from the condenser 47 can be tolerated without impairing accuracy, it is possible to employ suitable resistors at 41 and 42 which will eliminate the need for the neon lamp 43 and the resistor 44.

The two resistors 38 and 39 are for the purpose of proportioning the negative and positive potenthereon and said thyratrons being rendered active in accordance with the sequence of interruption of the negative bias thereto, a delayed action relay switch to stop the flow of plate current in said symmetrical circuits in response to interruption of light beams focused upon said photo-electric cells, two relay coils arranged one in each of said symmetrical circuits, a two-way relay switch selectively operated by said relay coils, two counting circuits including a power source and two solenoid actuated counters selectively controlled by the operation of said two-way relay switch.

8. A photo-electric counting device for selectively counting objects traveling in opposite directions, comprising a pair of counters, a pair of solenoids individually coacting with the respective counters, a power source for said solenoids, a two-way relay switch coacting with said power source for selectively energizing said solenoids one at a time, a pair of relay coils for selectively operating said relay switch, two thyratrons arranged in two symmetrical circuits including said relay coils one in each circuit and having a common power supply, two circuits individually supplying negative bias potentials to said thyratrons, two photo-electric cells arranged one in each bias circuit for controlling the negative bias potentials to said thyratrons respectively, said thyratrons being biased to cut-off when said photo-electric cells are rendered electro-conductive by light beams focused thereon and said thyratrons being rendered active in accordance with the sequence of interruption of the negative bias thereto so as to energize said relay coils in sequence and bring said relay switch under control of the relay coil first energized and thus operate the solenoid and counter of that respective relay coil, and a delayed action relay switch to stop the flow of plate current from said thyratrons and terminate each counting interval.

HOMER J. DANA.
HOWARD F. CLARKE.